US011904607B2

(12) United States Patent
Yokoo et al.

(10) Patent No.: US 11,904,607 B2
(45) **Date of Patent: *Feb. 20, 2024**

(54) DRIVE CIRCUIT AND LIQUID EJECTING APPARATUS

(71) Applicant: Seiko Epson Corporation, Tokyo (JP)

(72) Inventors: Shoichiro Yokoo, Matsumoto (JP); Noritaka Ide, Shiojiri (JP); Kunio Tabata, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 124 days.

This patent is subject to a terminal disclaimer.

(21) Appl. No.: 17/537,560

(22) Filed: Nov. 30, 2021

(65) Prior Publication Data

US 2022/0169013 A1 Jun. 2, 2022

(30) Foreign Application Priority Data

Dec. 1, 2020 (JP) ................................ 2020-199482

(51) Int. Cl.
*B41J 29/38* (2006.01)
*B41J 2/045* (2006.01)

(52) U.S. Cl.
CPC ....... *B41J 2/04541* (2013.01); *B41J 2/04581* (2013.01)

(58) Field of Classification Search
CPC ... B41J 2/04541; B41J 2/0455; B41J 2/04581
See application file for complete search history.

(56) References Cited

U.S. PATENT DOCUMENTS

| | | | |
|---|---|---|---|
| 8,757,749 | B2 | 6/2014 | Oshima et al. |
| 9,579,886 | B2 | 2/2017 | Sano |
| 2009/0195576 | A1 | 8/2009 | Oshima |
| 2010/0127777 | A1 | 5/2010 | Yoshino et al. |
| 2010/0188452 | A1 | 7/2010 | Oshima |
| 2012/0182339 | A1 | 7/2012 | Oshima et al. |
| 2013/0162351 | A1 | 6/2013 | Yoshino et al. |
| 2015/0062207 | A1 | 3/2015 | Abe |
| 2016/0221331 | A1 | 8/2016 | Sano |

FOREIGN PATENT DOCUMENTS

| | | | |
|---|---|---|---|
| JP | 2009-166349 | A | 7/2009 |
| JP | 2010-114500 | A | 5/2010 |
| JP | 2010-130340 | A | 6/2010 |

*Primary Examiner* — Lam S Nguyen
(74) *Attorney, Agent, or Firm* — Harness, Dickey & Pierce, P.L.C.

(57) ABSTRACT

An amplifier circuit, a level shift circuit; and a demodulation circuit, in which in a second mode obtained by shifting a reference potential of the amplification modulation signal to a second potential having a potential higher than a first potential, the second gate driver included in the level shift circuit performs a constant voltage control that outputs a third gate signal controlling a third transistor to be conductive and a fourth gate signal controlling a fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

8 Claims, 6 Drawing Sheets

DRIVE CIRCUIT AND LIQUID EJECTING APPARATUS

The present application is based on, and claims priority from JP Application Serial Number 2020-199482, filed Dec. 1, 2020, the disclosure of which is hereby incorporated by reference herein in its entirety.

BACKGROUND

1. Technical Field

The present disclosure relates to a drive circuit and a liquid ejecting apparatus.

2. Related Art

As an Ink jet printer that ejects ink to print an image and a document, a printer that uses a driving element such as a piezoelectric element (for example, piezo element) is known. Such a piezoelectric element is provided in a head unit corresponding to each of a plurality of nozzles, and each of the piezoelectric elements is driven according to a drive signal. As a result, a predetermined amount of ink (liquid) is ejected from the nozzle at a predetermined timing, and dots are formed on a medium. Since the piezoelectric element is a capacitive load like a capacitor when viewed electrically, it is necessary to supply a sufficient current in order to operate the piezoelectric element of each nozzle. Therefore, the piezoelectric element is driven by amplifying a source signal by an amplifier circuit and supplying the source signal to the head unit as a drive signal.

JP-A-2009-166349 describes a drive circuit including a modulation circuit that modulates a reference drive signal and a plurality of power amplifier circuits that power-amplify a signal output by the modulation circuit as a drive circuit that outputs a drive signal, and a liquid ejecting apparatus equipped with the drive circuit is disclosed.

However, from the viewpoint of improving waveform accuracy of the drive signal output by the drive circuit, the drive circuit described in JP-A-2009-166349 is not sufficient, and there is room for further improvement.

SUMMARY

According to an aspect of the present disclosure, there is provided a drive circuit that outputs a drive signal driving a drive portion, the circuit including a modulation circuit that outputs a modulation signal obtained by modulating a reference drive signal which is a reference of the drive signal; an amplifier circuit that outputs an amplification modulation signal obtained by amplifying the modulation signal from a first output point; a level shift circuit that outputs a level shift amplification modulation signal obtained by shifting a potential of the amplification modulation signal from a second output point; and a demodulation circuit that demodulates the level shift amplification modulation signal and outputs the drive signal, in which the amplifier circuit includes a first gate driver that outputs a first gate signal and a second gate signal based on the modulation signal, a first transistor of which a first voltage is supplied to one end, and the other end is electrically coupled to the first output point, and which operates based on the first gate signal, and a second transistor of which one end is electrically coupled to the first output point and which operates based on the second gate signal, the level shift circuit includes a bootstrap circuit to which a second voltage and the amplification modulation signal are input and which outputs a third voltage, a second gate driver that outputs a third gate signal and a fourth gate signal based on the reference drive signal, a third transistor of which the third voltage is supplied to one end, and the other end is electrically coupled to the second output point, and which operates based on the third gate signal, and a fourth transistor of which one end is electrically coupled to the second output point, and the other end is electrically coupled to the first output point, and which operates based on the fourth gate signal, a capacitive element of which one end is electrically coupled to the second gate driver, a fourth voltage is supplied, and the other end is electrically coupled to the other end of the third transistor, the level shift circuit has a first mode in which a reference potential of the amplification modulation signal is set to a first potential, and a second mode in which the reference potential of the amplification modulation signal is set to a second potential having a potential higher than the first potential, and In the second mode, the second gate driver performs a constant voltage control that outputs the third gate signal controlling the third transistor to be conductive and the fourth gate signal controlling the fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

According to another aspect of the present disclosure, there is provided a liquid ejecting apparatus including an ejecting portion that ejects a liquid; and a drive circuit that outputs a drive signal driving the ejecting portion, in which the drive circuit includes a modulation circuit that outputs a modulation signal obtained by modulating a reference drive signal which is a reference of the drive signal; an amplifier circuit that outputs an amplification modulation signal obtained by amplifying the modulation signal from a first output point; a level shift circuit that outputs a level shift amplification modulation signal obtained by shifting a potential of the amplification modulation signal from a second output point; and a demodulation circuit that demodulates the level shift amplification modulation signal and outputs the drive signal, in which the amplifier circuit includes a first gate driver that outputs a first gate signal and a second gate signal based on the modulation signal, a first transistor of which a first voltage is supplied to one end, and the other end is electrically coupled to the first output point, and which operates based on the first gate signal, and a second transistor of which one end is electrically coupled to the first output point and which operates based on the second gate signal, the level shift circuit includes a bootstrap circuit to which a second voltage and the amplification modulation signal are input and which outputs a third voltage, a second gate driver that outputs a third gate signal and a fourth gate signal based on the reference drive signal, a third transistor of which the third voltage is supplied to one end, and the other end is electrically coupled to the second output point, and which operates based on the third gate signal, and a fourth transistor of which one end is electrically coupled to the second output point, and the other end is electrically coupled to the first output point, and which operates based on the fourth gate signal, a capacitive element of which one end is electrically coupled to the second gate driver, a fourth voltage is supplied, and the other end is electrically coupled to the other end of the third transistor, the level shift circuit has a first mode in which a reference potential of the amplification modulation signal is set to a first potential, and a second mode in which the reference potential of the amplification modulation signal is set to a second potential having a potential higher than the first potential, and In the second mode, the second gate driver performs a constant voltage control that outputs the third gate signal controlling the third transistor to be conductive and the fourth gate signal controlling the fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

1. Overview of Liquid Ejecting Apparatus

Figure 1:
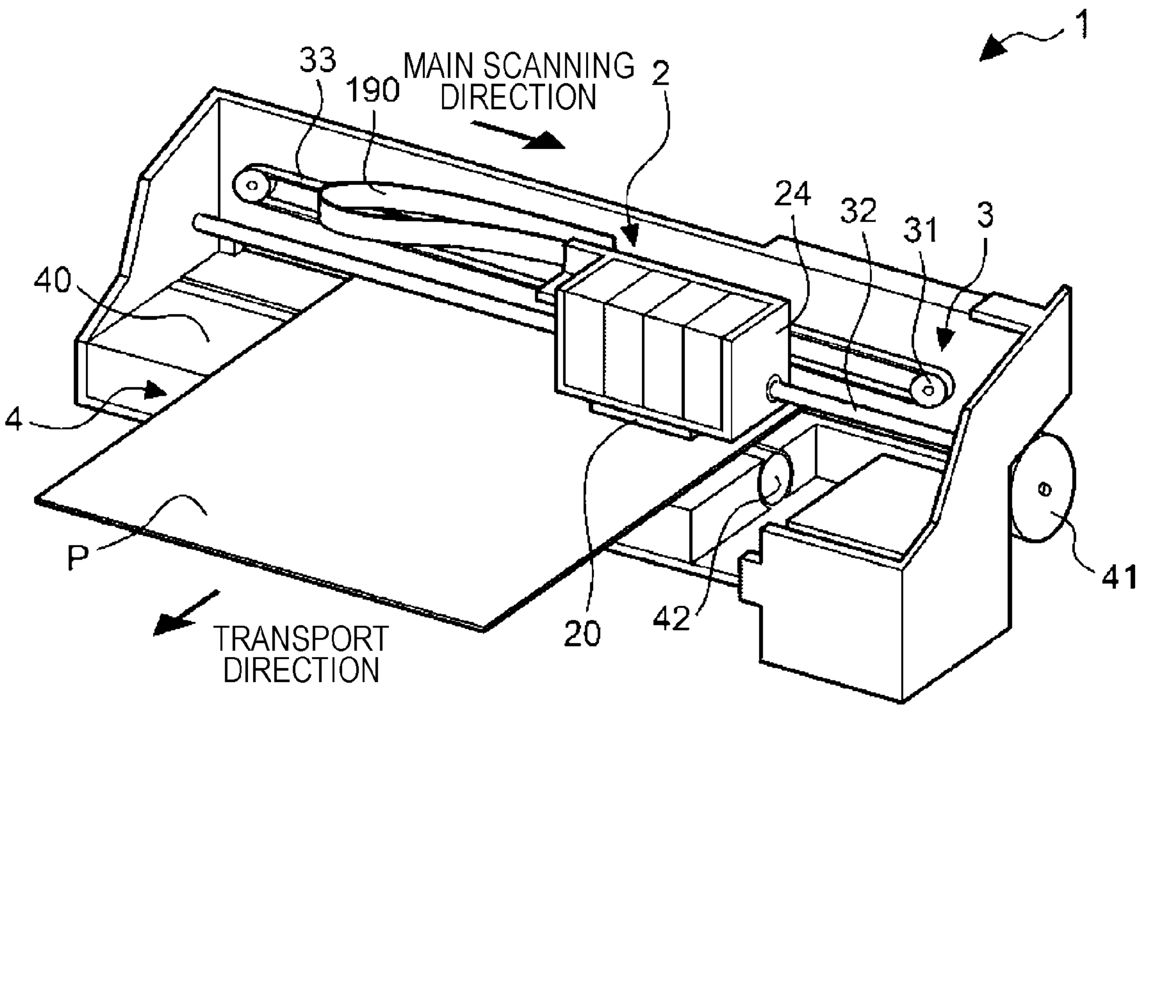
FIG. 1 is a view illustrating a structure of a liquid ejecting apparatus.

FIG. 1 is a view illustrating a structure of a liquid ejecting apparatus 1. As illustrated in FIG. 1, the liquid ejecting apparatus 1 is provided with a moving unit 3 that reciprocates a moving object 2 in a direction along a main scanning direction.

The moving unit 3 includes a carriage motor 31 that is a driving source for the movement of the moving object 2, a carriage guide shaft 32 having both ends fixed, and a timing belt 33 extending substantially parallel to the carriage guide shaft 32 and driven by the carriage motor 31.

The moving object 2 includes a carriage 24. The carriage 24 is reciprocally supported by the carriage guide shaft 32 and is fixed to a portion of the timing belt 33. As a result, the carriage motor 31 travels forward and reverse on the timing belt 33, so that the moving object 2 is guided by the carriage guide shaft 32 and reciprocates. A head unit 20 is provided in a portion of the moving object 2 facing a medium P. Multiple nozzles for ejecting ink as a liquid are located on a surface of the head unit 20 facing the medium P. Various control signals for controlling the operation of the head unit 20 are supplied to the head unit 20 via a flexible cable 190.

In addition, the liquid ejecting apparatus 1 is provided with a transport unit 4 for transporting the medium P on a platen 40 along a transport direction. The transport unit 4 includes a transport motor 41 that is a driving source for transporting the medium P, and a transport roller 42 that is rotated by the transport motor 41 and transports the medium P along the transport direction.

In the liquid ejecting apparatus 1 configured as described above, ink is ejected from the head unit 20 to the medium P at the timing when the medium P is transported by the transport unit 4, so that a desired image is formed on the surface of the medium P.

Figure 2:
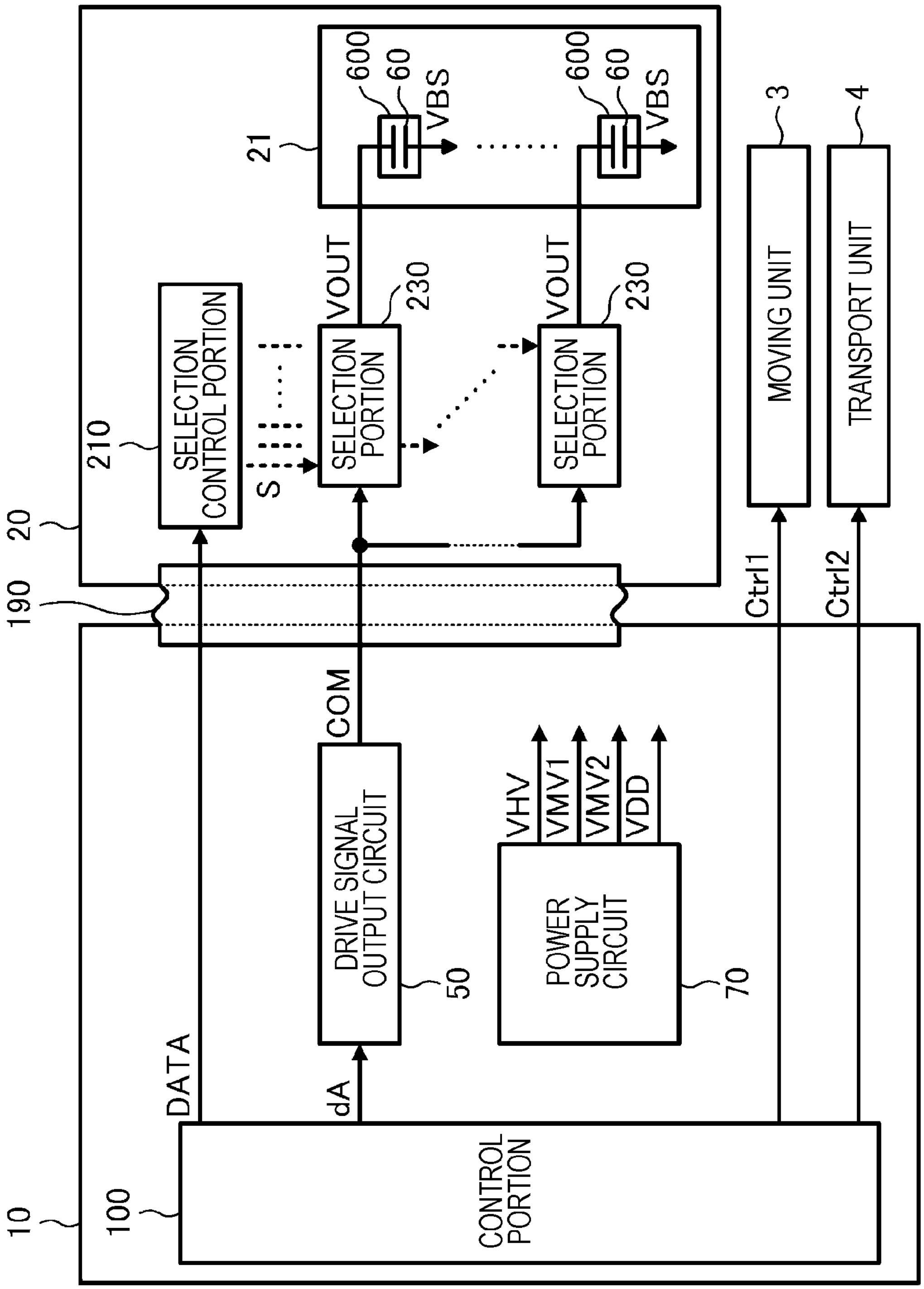
FIG. 2 is a diagram illustrating a functional configuration of the liquid ejecting apparatus.

Next, a functional configuration of the liquid ejecting apparatus 1 will be described. FIG. 2 is a diagram illustrating the functional configuration of the liquid ejecting apparatus 1. As illustrated in FIG. 2, the liquid ejecting apparatus 1 is provided with a control unit 10, a head unit 20, a moving unit 3, a transport unit 4, and a flexible cable 190 that electrically couples the control unit 10 and the head unit 20.

The control unit 10 includes a control portion 100, a drive signal output circuit 50, and a power supply circuit 70.

The power supply circuit 70 generates voltages VHV, VMV1, VMV2, and VDD having a predetermined voltage value from a commercial AC power supply supplied from the outside of the liquid ejecting apparatus 1, and outputs the voltages to the configuration of the corresponding liquid ejecting apparatus 1. Here, the voltage VHV in the present embodiment is a DC voltage having a potential larger than that of the voltages VMV1, VMV2, and VDD, the voltage VMV1 is a DC voltage having a potential larger than that of the voltages VMV2, and VDD, and the voltage VMV2 is a DC voltage having a potential larger than that of the voltage VDD. The power supply circuit 70 may output signals having different voltage values in addition to the voltages VHV, VMV1, VMV2, and VDD. In addition, the power supply circuit 70 may include an AC/DC converter that generates the voltage VHV from a commercial AC power supply and a DC/DC converter that generates the voltages VMV1, VMV2, and VDD from the voltage VHV.

An image data is supplied to the control portion 100 from an external device (not illustrated) provided outside the liquid ejecting apparatus 1, for example, from a host computer or the like. The control portion 100 generates various control signals for controlling each part of the liquid ejecting apparatus 1 by performing various image processing and the like on the supplied image data, and outputs the various control signals to the corresponding configurations.

Specifically, the control portion 100 generates a control signal Ctrl1 for controlling the reciprocating movement of the moving object 2 by the moving unit 3 and outputs the control signal Ctrl1 to the carriage motor 31 included in the moving unit 3. In addition, the control portion 100 generates a control signal Ctrl2 for controlling the transport of the medium P by the transport unit 4, and outputs the control signal Ctrl2 to the transport motor 41 included in the transport unit 4. As a result, the reciprocating movement of the moving object 2 along the main scanning direction and the transport of the medium P along the transport direction are controlled, and the head unit 20 can eject the ink on a desired position of the medium P. The control portion 100 may supply the control signal Ctrl1 to the moving unit 3 via a carriage motor driver (not illustrated), or may supply the control signal Ctrl2 to the transport unit 4 via a transport motor driver (not illustrated).

In addition, the control portion 100 outputs reference drive data dA to the drive signal output circuit 50. Here, the reference drive data dA is a digital signal including data that defines the waveform of the drive signal COM supplied to the head unit 20. The drive signal output circuit 50 converts the input reference drive data dA into an analog signal, and then amplifies the converted signal to generate a drive signal COM and supplies the drive signal COM to the head unit 20. The configuration and operation details of the drive signal output circuit 50 will be described later.

In addition, the control portion 100 generates a drive data signal DATA for controlling the operation of the head unit 20 and outputs the drive data signal DATA to the head unit 20. The head unit 20 includes a selection control portion 210, a plurality of selection portions 230, and an ejecting head 21. In addition, the ejecting head 21 includes a plurality of ejecting portions 600 including a piezoelectric element 60. Each of the plurality of selection portions 230 is provided corresponding to the piezoelectric element 60 included in each of a plurality of ejecting portions 600 included in the ejecting head 21.

The drive data signal DATA is input to the selection control portion 210. The selection control portion 210 generates a selection signal S instructing each of the selection portions 230 whether to select or not select the drive signal COM based on the input drive data signal DATA, and outputs the selection signal S to each of the plurality of selection portions 230. Each of the plurality of selection portions 230 selects or does not select the drive signal COM as a drive signal VOUT based on the input selection signal S. As a result, the selection portion 230 generates a drive signal VOUT based on the drive signal COM and supplies the drive signal VOUT to one end of the piezoelectric element 60 included in the corresponding ejecting portion 600 included in the ejecting head 21. In addition, a reference voltage signal VBS is supplied to the other end of the piezoelectric element 60. The reference voltage signal VBS is, for example, a signal having a DC voltage of 5 V or a ground potential, and functions as a reference potential of the piezoelectric element 60 that is driven according to the drive signal VOUT.

The piezoelectric element 60 is provided corresponding to each of the plurality of nozzles in the head unit 20. The piezoelectric element 60 is driven according to the potential difference between the drive signal VOUT supplied to one end and the reference voltage signal VBS supplied to the other end. As a result, ink is ejected from a nozzle described later provided corresponding to the piezoelectric element 60.

Although FIG. 2 illustrates when the head unit 20 is equipped with one ejecting head 21, the liquid ejecting apparatus 1 may include a plurality of ejecting heads 21 according to the number of types of ink to be ejected and the like.

2. Configuration of Ejecting Portion

Figure 3:
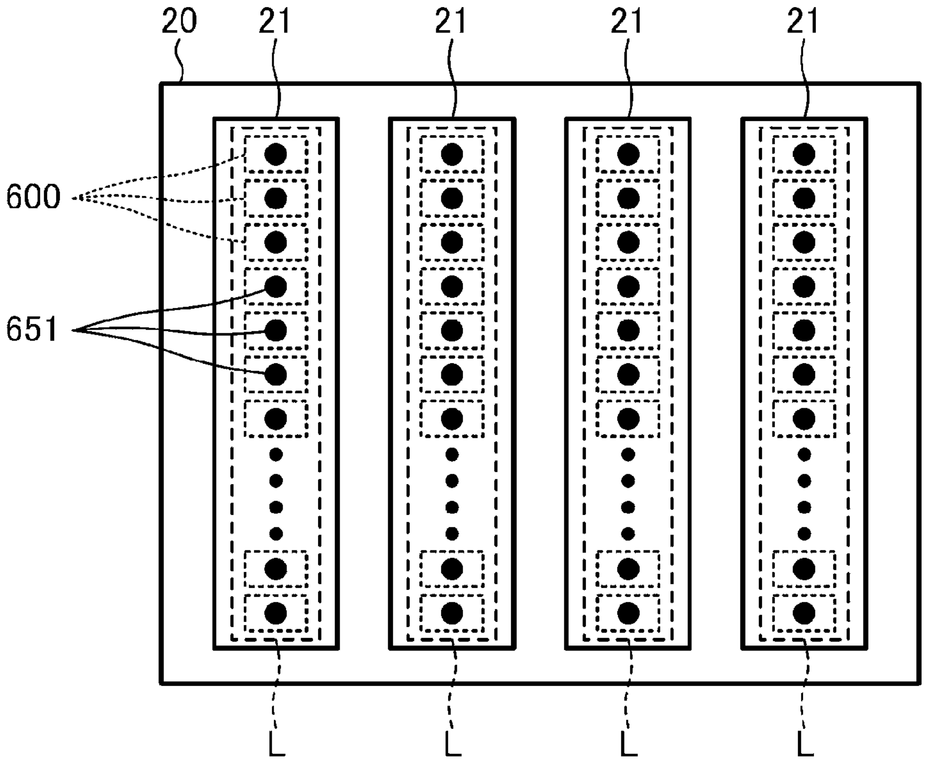
FIG. 3 is a diagram illustrating an example of arrangement of a plurality of ejecting portions in a head unit.

FIG. 3 is a diagram illustrating an example of arrangement of the plurality of ejecting portions 600 in the head unit 20. FIG. 3 illustrates when the head unit 20 includes four ejecting heads 21.

As illustrated in FIG. 3, the ejecting head 21 includes the plurality of ejecting portions 600 provided in a row in one direction. That is, the head unit 20 is formed with as many nozzle rows L as the number of ejecting heads 21 in which nozzles 651 included in the ejecting portion 600 are arranged in one direction. The arrangement of the nozzles 651 in the nozzle row L included in the ejecting head 21 is not limited to one row. For example, in the ejecting head 21, a plurality of nozzles 651 may have nozzle rows L in which the even-numbered nozzles 651 and the odd-numbered nozzles 651 counted from the ends are arranged in a staggered manner so as that the positions are different from each other, or a plurality of nozzles 651 may be arranged side by side in two or more rows to include the nozzle rows L.

Figure 4:
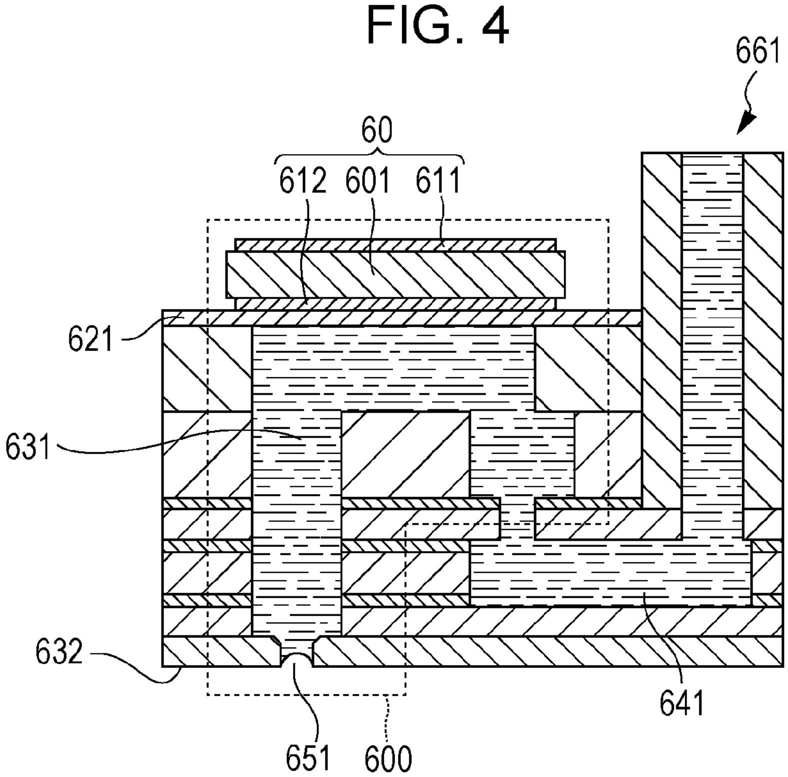
FIG. 4 is a diagram illustrating a schematic configuration of the ejecting portion.

Next, an example of the configuration of the ejecting portion 600 will be described. FIG. 4 is a diagram illustrating a schematic configuration of the ejecting portion 600. As illustrated in FIG. 4, the ejecting portion 600 includes a piezoelectric element 60, a diaphragm 621, a cavity 631, and a nozzle 651. The cavity 631 is filled with ink supplied from a reservoir 641. In addition, ink is introduced into the reservoir 641 from an ink cartridge (not illustrated) via a supply port 661. That is, the ink stored in the corresponding ink cartridge is supplied to the cavity 631 via the reservoir 641.

The diaphragm 621 is displaced by driving the piezoelectric element 60 provided on the upper surface in FIG. 4. As the diaphragm 621 is displaced, the internal volume of the cavity 631 filled with ink is expanded and is reduced. That is, the diaphragm 621 functions as a diaphragm that changes the internal volume of the cavity 631. The nozzle 651 is an opening portion provided in a nozzle plate 632 and communicates with the cavity 631. As the internal volume of the cavity 631 changes, the amount of ink according to the change in the internal volume is introduced into the cavity 631 and ejected from the nozzle 651.

The piezoelectric element 60 has a structure in which a piezoelectric body 601 is interposed between a pair of electrodes 611 and 612. In the piezoelectric body 601 having such a structure, a central portion of the electrodes 611 and 612 bends in the vertical direction together with the diaphragm 621 according to the potential difference of the voltage supplied by the electrodes 611 and 612. Specifically, the drive signal VOUT is supplied to the electrode 611 of the piezoelectric element 60, and the reference potential signal is supplied to the electrode 612. When the voltage level of the drive signal VOUT supplied to the electrode 611 is low, the corresponding piezoelectric element 60 bends upward, and when the voltage level of the drive signal VOUT supplied to the electrode 611 is high, the corresponding piezoelectric element 60 bends downward.

In the ejecting portion 600 configured as described above, the piezoelectric element 60 bends upward, so that the diaphragm 621 is displaced upward and the internal volume of the cavity 631 is expanded. As a result, ink is drawn from the reservoir 641. On the other hand, when the piezoelectric element 60 bends downward, the diaphragm 621 is displaced downward, and the internal volume of the cavity 631 is reduced. As a result, an amount of ink according to the degree of reduction is ejected from the nozzle 651. Here, the piezoelectric element 60 is not limited to the configuration of a bending vibration illustrated in FIG. 4, and may have a structure using a longitudinal vibration, for example.

Here, the ejecting portion 600 including the piezoelectric element 60 is an example of the drive portion, and the drive signal COM that is a reference of the drive signal VOUT that drives the drive portion is an example of the drive signal. The drive signal output circuit 50 that outputs the drive signal COM driving the ejecting portion 600 is an example of the drive circuit. Considering that the drive signal VOUT is generated by selecting or not selecting the drive signal COM, the drive signal VOUT is also an example of the drive signal in a broad sense. The head unit 20 or the ejecting head 21 is an example of the liquid ejecting head.

3. Configuration of Drive Signal Output Circuit

As described above, the piezoelectric element 60, which is driven by the ejecting portion 600 included in the head unit 20 to eject ink, is driven by the drive signal VOUT based on the drive signal COM generated by the drive signal output circuit 50. The configuration and operation of the drive signal output circuit 50 that generates and outputs the drive signal COM which is the reference of such a drive signal VOUT will be described.

3.1 Voltage Waveform of Drive Signal COM

Figure 5:
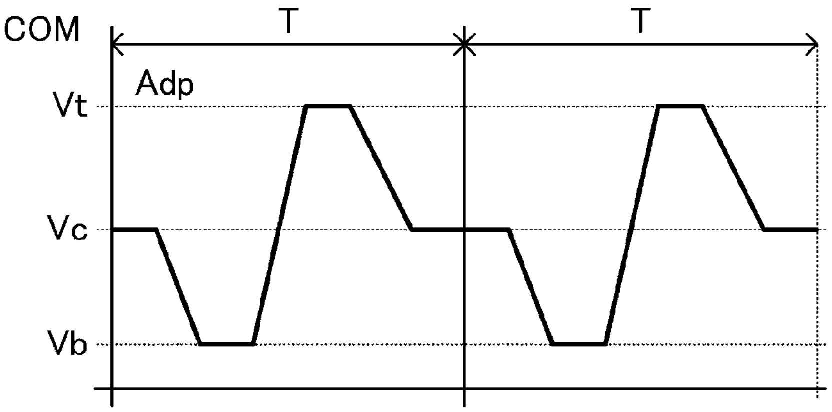
FIG. 5 is a graph illustrating an example of a waveform of a drive signal COM.

First, an example of a waveform of the drive signal COM generated by the drive signal output circuit 50 will be described. FIG. 5 is a graph illustrating an example of the waveform of the drive signal COM. As illustrated in FIG. 5, the drive signal COM is a signal including a trapezoidal waveform Adp for each period T. The trapezoidal waveform Adp included in the drive signal COM has a certain period at a voltage Vc, a certain period at a voltage Vb with a lower potential than that in the voltage Vc located after a certain period at the voltage Vc, a certain period at a voltage Vt with a higher potential than that in the voltage Vc located after a certain period at the voltage Vb, and a certain period at the voltage Vc located after a certain period at the voltage Vt. That is, the drive signal COM includes a trapezoidal waveform Adp that starts at a voltage Vc and ends at a voltage Vc.

Here, the voltage Vc functions as a reference potential that serves as a reference for the displacement of the piezoelectric element 60 driven by the drive signal COM. When the voltage value of the drive signal COM supplied to the piezoelectric element 60 changes from the voltage Vc to the voltage Vb, the piezoelectric element 60 bends upward in FIG. 4, and as a result, the diaphragm 621 is displaced upward as illustrated in FIG. 4. When the diaphragm 621 is displaced upward, the internal volume of the cavity 631 is expanded, and ink is drawn from the reservoir 641 into the cavity 631. Thereafter, when the voltage value of the drive signal COM supplied to the piezoelectric element 60 changes from the voltage Vb to the voltage Vt, the piezoelectric element 60 bends downward as illustrated in FIG. 4, and as a result, the diaphragm 621 is displaced downward as illustrated in FIG. 4. When the diaphragm 621 is displaced downward, the internal volume of the cavity 631 is reduced, and the ink stored in the cavity 631 is ejected from the nozzle 651. In addition, after the ink is ejected from the nozzle 651 by driving the piezoelectric element 60, the ink or the diaphragm 621 in the vicinity of the nozzle 651 may continue to vibrate for a certain period. The certain period at the voltage Vc included in the drive signal COM also functions as a period for stopping the vibration not contributing to the ejection of such an ink or the ink generated in the diaphragm 621.

That is, when the drive signal COM illustrated in FIG. 5 is supplied to the piezoelectric element 60, the piezoelectric element 60 is not driven and is held in a constant state for a certain period during which the signal waveform of the drive signal COM is a voltage Vc. The piezoelectric element 60 is driven so as to supply the liquid to the ejecting portion 600 in the period during which the signal waveform of the drive signal COM changes from the voltage Vc to the voltage Vb. The piezoelectric element 60 is driven so as to eject the ink supplied to the ejecting portion 600 in the period during which the signal waveform of the drive signal COM changes from the voltage Vb to the voltage Vt.

Here, in the signal waveform of the drive signal COM, a signal waveform that changes from the voltage Vc driving the piezoelectric element 60 so as to supply the liquid to the ejecting portion 600 to the voltage Vb is an example of a first drive waveform, a signal waveform that changes from a voltage Vb driving the piezoelectric element 60 so as to eject the ink supplied to the ejecting portion 600 to a voltage Vt is an example of a second drive waveform, and a constant signal waveform with a voltage Vc that holds the piezoelectric element 60 in a constant state without driving the piezoelectric element 60 is an example of a third signal waveform. In addition, in the signal waveform of the drive signal COM, the constant waveform with the voltage Vb is a waveform that holds the piezoelectric element 60 in a driven state so as to supply the liquid to the ejecting portion 600. Therefore, in a broad sense, it is understood that a constant waveform with the voltage Vb is also included in the first drive waveform. The constant waveform with the voltage Vt is a waveform that holds the piezoelectric element 60 in a driven state so as to eject the ink supplied to the ejecting portion 600. Therefore, in a broad sense, it is understood that a constant waveform with the voltage Vt is also included in the second drive waveform.

3.2 Configuration of Drive Signal Output Circuit

Figure 6:
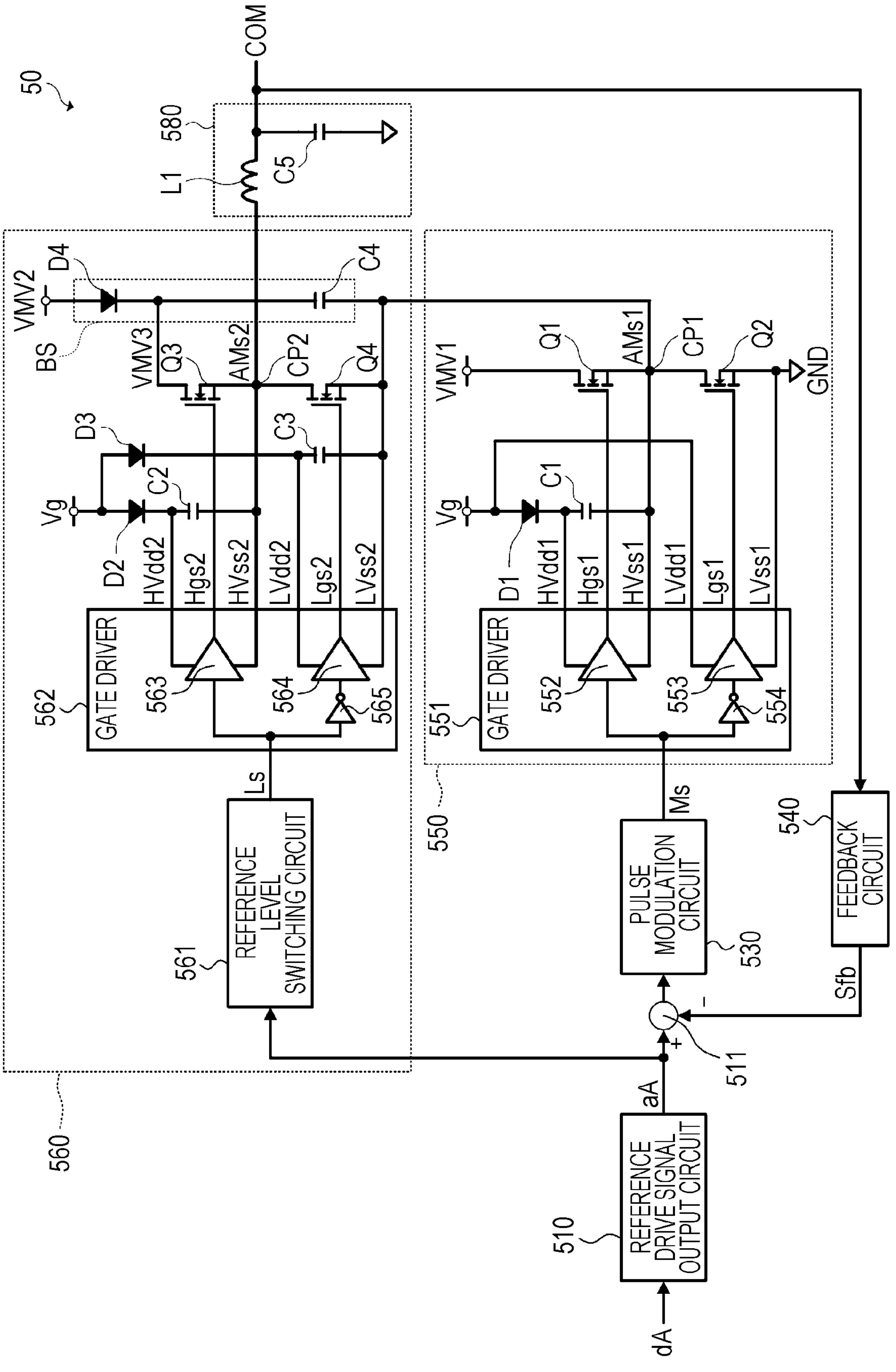
FIG. 6 is a diagram illustrating a functional configuration of a drive signal output circuit.

Next, the configuration of the drive signal output circuit 50 that generates and outputs the drive signal COM will be described. FIG. 6 is a diagram illustrating a functional configuration of the drive signal output circuit 50. As illustrated in FIG. 6, the drive signal output circuit 50 includes a reference drive signal output circuit 510, an adder 511, a pulse modulation circuit 530, a feedback circuit 540, a digital amplifier circuit 550, a level shift circuit 560, and a demodulation circuit 580.

The reference drive data dA, which is a digital signal, is input from the control portion 100 to the reference drive signal output circuit 510. The reference drive signal output circuit 510 performs digital-to-analog conversion of the input reference drive data dA, and then outputs the converted analog signal as a reference drive signal aA. That is, the reference drive signal output circuit 510 includes a digital to analog (D/A) converter. The voltage amplitude of the reference drive signal aA is, for example, 1 to 2 V, and the drive signal output circuit 50 outputs a signal obtained by amplifying the reference drive signal aA as a drive signal COM. That is, the reference drive signal aA corresponds to a target signal before amplification of the drive signal COM.

The reference drive signal aA is input to a positive side input terminal of the adder 511, and the feedback signal Sfb of the drive signal COM supplied via the feedback circuit 540 is input to a negative side input terminal. The adder 511 subtracts the voltage input to the negative side input terminal from the voltage input to the positive side input terminal, and outputs the integrated voltage to the pulse modulation circuit 530.

The pulse modulation circuit 530 generates a modulation signal Ms by pulse-modulating the signal input from the adder 511, and outputs the generated modulation signal Ms to the digital amplifier circuit 550. Such a pulse modulation circuit 530 generates a pulse density modulation signal (PDM signal) obtained by modulating the signal input from the adder 511 by a pulse density modulation (PDM) method, and outputs the PDM signal as a modulation signal Ms to the digital amplifier circuit 550. That is, the pulse modulation circuit 530 outputs the modulation signal Ms obtained by modulating the reference drive signal aA corresponding to the reference drive data dA, which is the reference of the drive signal COM, by the pulse density modulation method.

The digital amplifier circuit 550 includes a gate driver 551, a diode D1, a capacitor C1, and transistors Q1 and Q2. The digital amplifier circuit 550 outputs an amplification modulation signal AMs1 that amplifies the modulation signal Ms from a midpoint CP1.

Specifically, the modulation signal Ms is input to the gate driver 551 included in the digital amplifier circuit 550. The gate driver 551 outputs a gate signal Hgs1 for driving the transistor Q1 and a gate signal Lgs1 for driving the transistor Q2 based on the logic level of the input modulation signal Ms.

The transistors Q1 and Q2 are both configured to include N-channel MOS-FETs. The gate signal Hgs1 output by the gate driver 551 is input to a gate terminal of the transistor Q1. A voltage VMV1 is supplied to a drain terminal of the transistor Q1, and a source terminal of the transistor Q1 is coupled to the midpoint CP1. In addition, the gate signal Lgs1 output by the gate driver 551 is input to a gate terminal of the transistor Q2. A drain terminal of the transistor Q2 is coupled to the midpoint CP1, and the ground potential GND is supplied to a source terminal of the transistor Q2.

That is, in the transistor Q1, the voltage VMV1 is supplied to the drain terminal at one end, the source terminal at the other end is electrically coupled to the midpoint CP1, and the transistor Q1 operates based on the gate signal Hgs1. In the transistor Q2, the drain terminal at one end is electrically coupled to the midpoint CP1 and the transistor Q2 operates based on the gate signal Lgs1. The digital amplifier circuit 550 outputs the generated signal to the midpoint CP1 to which the transistor Q1 and the transistor Q2 are coupled as the amplification modulation signal AMs1.

Here, the operation of the gate driver 551 that outputs the gate signal Hgs1 and the gate signal Lgs1 based on the modulation signal Ms will be described. The gate driver 551 includes gate drive circuits 552 and 553 and an inverter circuit 554. The modulation signal Ms input to the gate driver 551 is input to the gate drive circuit 552 and also input to the gate drive circuit 553 via the inverter circuit 554. That is, the signal input to the gate drive circuit 552 and the signal input to the gate drive circuit 553 are exclusively at the H-level. Here, the signal that is exclusively H-level means that the H-level signal is not simultaneously input to the gate drive circuit 552 and the gate drive circuit 553. That is, it does not exclude when the L-level signal is simultaneously input to the gate drive circuit 552 and the gate drive circuit 553.

A low potential side power supply terminal of the gate drive circuit 552 is coupled to the midpoint CP1. Therefore, the potential signal of the midpoint CP1 is supplied as a voltage HVss1 to the low potential side power supply terminal of the gate drive circuit 552. In addition, a high potential side power supply terminal of the gate drive circuit 552 is coupled to a cathode terminal of the diode D1 to which the voltage Vg is supplied to an anode terminal, and is also coupled to one end of the capacitor C1. The other end of the capacitor C1 is coupled to the midpoint CP1. That is, the high potential side input terminal of the gate drive circuit 552 is configured to include a bootstrap circuit including the capacitor C1 that functions as a bootstrap capacitor. Therefore, a voltage HVdd1 having a potential larger than that in the voltage HVss1 input to the low potential side input terminal by a voltage Vg is supplied to the high potential side input terminal of the gate drive circuit 552.

Therefore, when the H-level modulation signal Ms is input to the gate drive circuit 552, the gate drive circuit 552 outputs the H-level gate signal Hgs1 having a potential based on the voltage HVdd1 which is larger than the potential of the midpoint CP1 by a voltage Vg. When the L-level modulation signal Ms is input to the gate drive circuit 552, the gate drive circuit 552 outputs the L-level gate signal Hgs1 having a potential based on the voltage HVss1 which is the potential of the midpoint CP1. Here, the voltage Vg is a DC voltage generated by stepping down or stepping up the voltages VHV, VMV1, VMV2, and VDD output by the power supply circuit 70, is a voltage value capable of driving each of the transistors Q1, Q2, Q3, and Q4, and is, for example, a DC voltage of 7.5 V.

A ground potential GND signal is supplied as a voltage LVss1 to the low potential side power supply terminal of the gate drive circuit 553. In addition, a voltage Vg is supplied as a voltage LVdd1 to the high potential side power supply terminal of the gate drive circuit 553.

Therefore, when the H-level signal in which the logic level of the L-level modulation signal Ms is inverted by the inverter circuit 554 is input to the gate drive circuit 553, the gate drive circuit 553 outputs an H-level gate signal Lgs1 having a potential based on the voltage LVdd1 which is a voltage Vg. When the L-level signal in which the logic level of the H-level modulation signal Ms is inverted by the inverter circuit 554 is input to the gate drive circuit 553, the gate drive circuit 553 outputs an L-level gate signal Lgs1 having a potential based on the voltage LVss1 which is the ground potential GND.

The level shift circuit 560 includes a reference level switching circuit 561, a gate driver 562, diodes D2 and D3, capacitors C2 and C3, transistors Q3 and Q4, and a bootstrap circuit BS. The level shift circuit 560 outputs a level shift amplification modulation signal AMs2 obtained by shifting the reference potential of the amplification modulation signal AMs1 from a midpoint CP2.

Specifically, the reference drive signal aA output by the reference drive signal output circuit 510 is input to the reference level switching circuit 561 included in the level shift circuit 560. The reference level switching circuit 561 generates a level switching signal Ls based on the reference drive signal aA and outputs the level switching signal Ls to the gate driver 562. Here, when the potential of the reference drive signal aA is equal to or higher than a threshold voltage aVth which is a predetermined potential, the reference level switching circuit 561 generates an H-level level switching signal Ls and outputs the H-level level switching signal Ls to the gate driver 562. When the potential of the reference drive signal aA is less than the threshold voltage aVth, the reference level switching circuit 561 generates an L-level level switching signal Ls and outputs the L-level level switching signal Ls to the gate driver 562.

The gate driver 562 outputs the gate signal Hgs2 for driving the transistor Q3 and the gate signal Lgs2 for driving the transistor Q4 according to the logic level of the level switching signal Ls based on the reference drive signal aA.

The transistors Q3 and Q4 are both configured to include N-channel MOS-FETs. The gate signal Hgs2 output by the gate driver 562 is input to a gate terminal of the transistor Q3. In addition, the voltage VMV3 output by the bootstrap circuit BS is supplied to a drain terminal of the transistor Q3, and the source terminal is coupled to a midpoint CP2. The gate signal Lgs2 output by the gate driver 562 is input to a gate terminal of the transistor Q4. In addition, a drain terminal of the transistor Q4 is coupled to the midpoint CP2, and a source terminal of the transistor Q4 is coupled to the midpoint CP1.

That is, in the transistor Q3, the voltage VMV3 output by the bootstrap circuit BS is supplied to the drain terminal at one end, the source terminal at the other end is electrically coupled to the midpoint CP2, and the transistor Q3 operates based on the gate signal Hgs2. In addition, in the transistor Q4, the drain terminal at one end is electrically coupled to the midpoint CP2, and the source terminal at the other end is electrically coupled to the midpoint CP1, and the transistor Q4 operates based on the gate signal Lgs2. The level shift circuit 560 outputs the generated signal to the midpoint CP2 to which the transistor Q3 and the transistor Q4 are coupled as the level shift amplification modulation signal AMs2.

The bootstrap circuit BS includes a diode D4 and a capacitor C4. A voltage VMV2 is supplied to the anode terminal of the diode D4, and the cathode terminal of the diode D4 is electrically coupled to one end of the capacitor C4. In addition, the other end of the capacitor C4 is electrically coupled to the midpoint CP1. That is, the voltage VMV2 and the amplification modulation signal AMs1 output to the midpoint CP1 are input to the bootstrap circuit BS. The bootstrap circuit BS outputs a voltage VMV3 having a potential obtained by adding the potential of the amplification modulation signal AMs1 to the potential of the voltage VMV2 to the drain terminal of the transistor Q3. That is, the potential of the drain terminal of the transistor Q3 is defined based on the potential of the amplification modulation signal AMs1 output from the digital amplifier circuit 550.

Here, the operation of the gate driver 562 that outputs the gate signal Hgs2 and the gate signal Lgs2 based on the modulation signal Ms will be described. The gate driver 562 includes gate drive circuits 563 and 564 and an inverter circuit 565. The level switching signal Ls based on the reference drive signal aA input to the gate driver 562 is input to the gate drive circuit 563 and is also input to the gate drive circuit 564 via the inverter circuit 565. That is, the signal input to the gate drive circuit 563 and the signal input to the gate drive circuit 564 are exclusively at the H-level. Here, the signal that is exclusively H-level means that the H-level signal is not simultaneously input to the gate drive circuit 563 and the gate drive circuit 564. That is, it does not exclude when the L-level signal is simultaneously input to the gate drive circuit 563 and the gate drive circuit 564.

A low potential side power supply terminal of the gate drive circuit 563 is coupled to the midpoint CP2. Therefore, the potential signal of the midpoint CP2 is supplied as a voltage HVss2 to the low potential side power supply terminal of the gate drive circuit 563. In addition, a high potential side power supply terminal of the gate drive circuit 563 is coupled to a cathode terminal of the diode D2 to which the voltage Vg is supplied to an anode terminal, and is also coupled to one end of the capacitor C2. The other end of the capacitor C2 is coupled to the midpoint CP2. That is, one end of the capacitor C2 is electrically coupled to the gate driver 562, and the other end is a source terminal which is the other end of the transistor Q3 and is electrically coupled to the midpoint CP2. A voltage Vg is supplied to one end of the capacitor C2 via the diode D2. That is, the high potential side input terminal of the gate drive circuit 563 is configured to include a bootstrap circuit including a capacitor C2 that functions as a bootstrap capacitor. As a result, a voltage HVdd2 having a potential larger than that in the voltage HVss2 input to the low potential side input terminal by a voltage Vg is supplied to the high potential side power supply terminal of the gate drive circuit 563.

The low potential side power supply terminal of the gate drive circuit 564 is coupled to the midpoint CP1. Therefore, the potential signal of the midpoint CP1 is supplied as the voltage LVss2 to the low potential side power supply terminal of the gate drive circuit 564. In addition, the high potential side power supply terminal of the gate drive circuit 564 is coupled to the cathode terminal of the diode D3 to which the voltage Vg is supplied to the anode terminal, and is also coupled to one end of the capacitor C3. The other end of the capacitor C3 is coupled to the midpoint CP1. That is, the high potential side input terminal of the gate drive circuit 564 is configured to include a bootstrap circuit including a capacitor C3 that functions as a bootstrap capacitor. That is, a voltage LVdd2 having a potential larger than that in the voltage LVss2 input to the low potential side input terminal by a voltage Vg is supplied to the high potential side input terminal of the gate drive circuit 564.

Therefore, when the H-level signal in which the logic level of the L-level level switching signal Ls is inverted by the inverter circuit 565 is input to the gate drive circuit 564, the gate drive circuit 564 outputs an H-level gate signal Lgs2 having a potential based on the voltage LVdd2, which is larger than the potential of the midpoint CP1 by a voltage Vg. When the L-level signal in which the logic level of the H-level level switching signal Ls is inverted by the inverter circuit 565 is input to the gate drive circuit 563, the gate drive circuit 564 outputs an L-level gate signal Lgs2 having a potential based on the voltage LVss2, which is the potential of the midpoint CP1.

The demodulation circuit 580 demodulates the level shift amplification modulation signal AMs2 output from the level shift circuit 560 by smoothing, and outputs a drive signal COM. The demodulation circuit 580 includes an inductor L1 and a capacitor C5. One end of the inductor L1 is electrically coupled to the midpoint CP2, and the other end is electrically coupled to one end of the capacitor C5. A ground potential GND is supplied to the other end of the capacitor C5. That is, the inductor L1 and the capacitor C5 form a low-pass filter circuit. As a result, the level shift amplification modulation signal AMs2 output from the level shift circuit 560 is smoothed, and the smoothed voltage is output from the drive signal output circuit 50 as a drive signal COM.

The feedback circuit 540 is electrically coupled to the pulse modulation circuit 530 and the demodulation circuit 580, and supplies the feedback signal Sfb obtained by attenuated the drive signal COM generated by the demodulation circuit 580 to the adder 511. That is, the drive signal output circuit 50 is provided with a feedback circuit 540 that is electrically coupled to the pulse modulation circuit 530 and the demodulation circuit 580 and outputs the feedback signal Sfb based on the drive signal COM. As a result, the drive signal COM output from the demodulation circuit 580 is fed back to the pulse modulation circuit 530, and as a result, the accuracy of the drive signal COM is improved.

Here, the pulse modulation circuit 530 that modulates the reference drive signal aA is an example of a modulation circuit, the digital amplifier circuit 550 is an example of an amplifier circuit, and the midpoint CP1 from which the amplification modulation signal AMs1 is output from the digital amplifier circuit 550 is an example of a first output point. In addition, the midpoint CP2 at which the level shift circuit 560 outputs the level shift amplification modulation signal AMs2 is an example of a second output point. The gate driver 551 included in the digital amplifier circuit 550 is an example of the first gate driver, the gate signal Hgs1 output by the gate driver 551 is an example of the first gate signal, and the gate signal Lgs1 output by the gate driver 551 is an example of the second gate signal. The transistor Q1 operating based on the gate signal Hgs1 is an example of the first transistor, and the transistor Q2 operating based on the gate signal Lgs1 is an example of the second transistor. In addition, the gate driver 562 included in the level shift circuit 560 is an example of the second gate driver, the gate signal Hgs2 output by the gate driver 562 is an example of the third gate signal, and the gate signal Lgs2 output by the gate driver 562 is an example of the fourth gate signal. The transistor Q3 operating based on the gate signal Hgs2 is an example of the third transistor, and the transistor Q4 operating based on the gate signal Lgs2 is an example of the fourth transistor. The voltage VMV1 supplied to the drain terminal at one end of the transistor Q1 is an example of the first voltage, the voltage VMV2 supplied to the bootstrap circuit BS is an example of the second voltage. The voltage VMV3 output by the bootstrap circuit BS and supplied to the drain terminal at one end of the transistor Q3 is an example of the third voltage, and the voltage Vg supplied to the capacitor C2 via the diode D2 is an example of the fourth voltage.

3.3 Operation of Drive Signal Output Circuit

Figure 7:
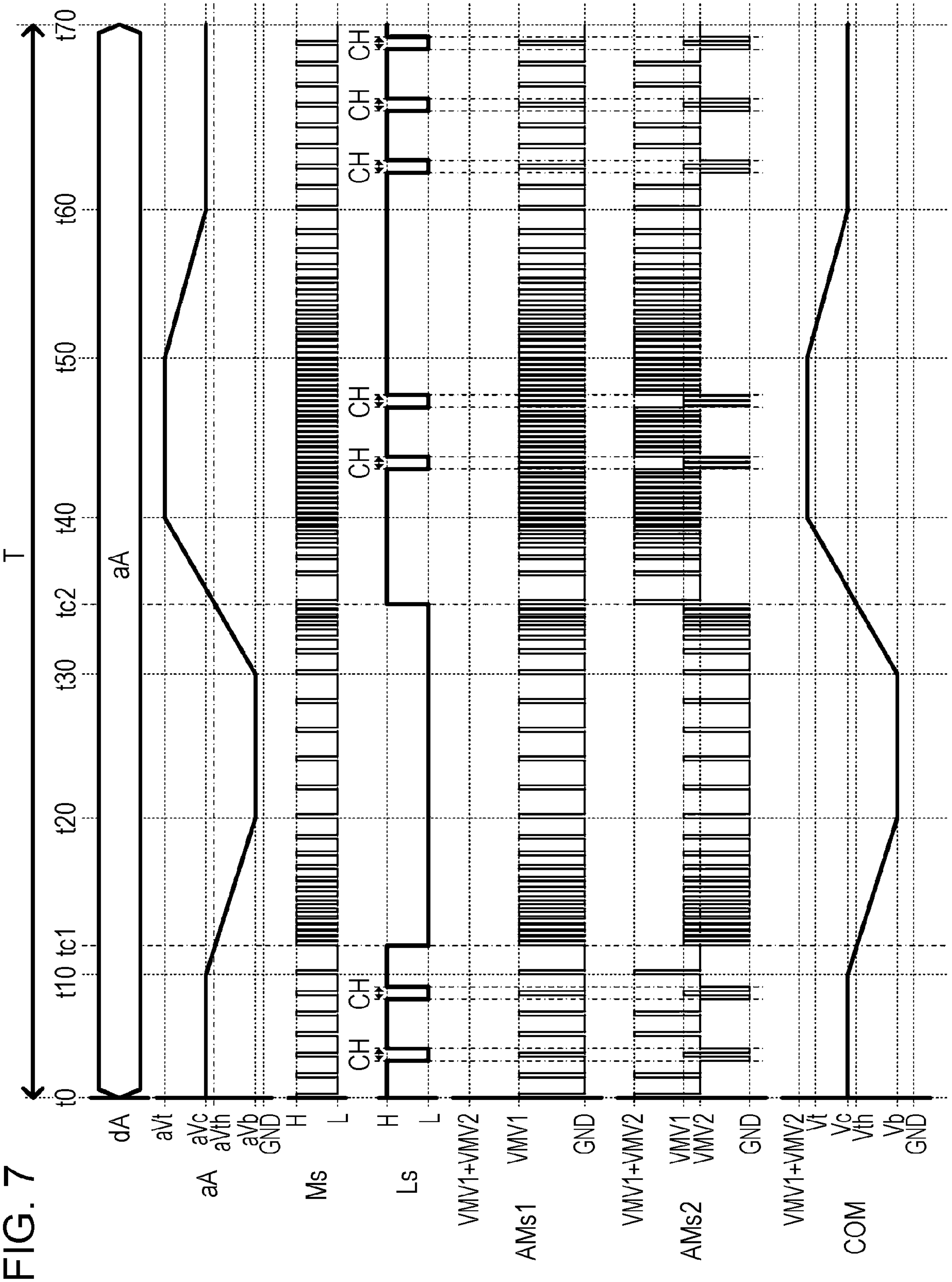
FIG. 7 is a graph for describing an operation of the drive signal output circuit.

The operation when the drive signal output circuit 50 configured as described above generates the drive signal COM will be described. FIG. 7 is a graph for describing the operation of the drive signal output circuit 50. FIG. 7 illustrates only the drive signal COM in a predetermined period T in the drive signal COM output by the drive signal output circuit 50. Here, in FIG. 7, the threshold voltage aVth, which is a potential for switching whether the reference level switching circuit 561 outputs the H-level level switching signal Ls or the L-level level switching signal Ls, will be described as having a potential smaller than that in the voltage aVc before amplification of the voltage Vc. In addition, in the following description, in the signal waveform of the drive signal COM illustrated in FIG. 5, the voltage value of the reference drive signal aA corresponding to a certain period at the voltage Vc may be referred to as a voltage aVc, the voltage value of the reference drive signal aA corresponding to a certain period at the voltage Vb may be referred to as a voltage aVb, and the voltage value of the reference drive signal aA corresponding to a certain period at the voltage Vt may be referred to as a voltage aVt. The potential of the drive signal COM corresponding to the threshold voltage aVth of the reference drive signal aA described above may be referred to as a threshold voltage Vth.

As illustrated in FIG. 7, the drive signal output circuit 50 outputs a constant drive signal COM with a voltage value of voltage Vc in the period from time t0 to time t10. Specifically, in the period from time t0 to time t10, the reference drive data dA for generating a constant drive signal COM with a voltage value of voltage Vc is input to the reference drive signal output circuit 510. The reference drive signal output circuit 510 generates a constant reference drive signal aA at a voltage aVc based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. As illustrated in FIG. 7, since the potential of the reference drive signal aA is larger than that in the threshold voltage aVth in the period from time t0 to time t10, the reference level switching circuit 561 outputs the H-level level switching signal Ls to the gate driver 562. As a result, the gate driver 562 outputs the H-level gate signal Hgs2 according to the logic level of the input level switching signal Ls and the L-level gate signal Lgs2 according to the signal in which the logic level of the input level switching signal Ls is inverted by the inverter circuit 565. As a result, the transistor Q3 is controlled to be conductive, and the transistor Q4 is controlled to be non-conductive. Therefore, the level shift amplification modulation signal AMs2 obtained by shifting the reference potential of the amplification modulation signal AMs1 output to the midpoint CP1 of the digital amplifier circuit 550 according to the voltage VMV2 input to the bootstrap circuit BS is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t0 to time t10, the drive signal output circuit 50 outputs a constant drive signal COM with a voltage value of voltage Vc.

In the period from time t10 to time t20, the drive signal output circuit 50 outputs a drive signal COM in which the voltage value changes from voltage Vc to voltage Vb. Specifically, in the period from time t10 to time t20, the reference drive data dA for generating the drive signal COM in which the voltage value changes from the voltage Vc to the voltage Vb is input to the reference drive signal output circuit 510. The reference drive signal output circuit 510 generates a reference drive signal aA in which the voltage value changes from the voltage aVc to the voltage aVb based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. In the period from time t10 to time t20, in the period from time t10 to time tc1 in which the voltage value of the reference drive signal aA is higher than the threshold voltage aVth, the reference level switching circuit 561 outputs the H-level level switching signal Ls to the gate driver 562. As a result, the gate driver 562 outputs the H-level gate signal Hgs2 according to the logic level of the input level switching signal Ls and the L-level gate signal Lgs2 according to the signal in which the logic level of the input level switching signal Ls is inverted by the inverter circuit 565. As a result, the transistor Q3 is controlled to be conductive, and the transistor Q4 is controlled to be non-conductive. Therefore, the level shift amplification modulation signal AMs2 obtained by shifting the reference potential of the amplification modulation signal AMs1 output to the midpoint CP1 of the digital amplifier circuit 550 according to the voltage VMV2 input to the bootstrap circuit BS is output to the midpoint CP2 of the level shift circuit 560.

In addition, in the period from time t10 to time t20, in the period from time tc1 to time t20 in which the voltage value of the reference drive signal aA is lower than the threshold voltage aVth, the reference level switching circuit 561 outputs the L-level level switching signal Ls to the gate driver 562. As a result, the gate driver 562 outputs the L-level gate signal Hgs2 according to the logic level of the input level switching signal Ls and the H-level gate signal Lgs2 according to the signal in which the logic level of the input level switching signal Ls is inverted by the inverter circuit 565. As a result, the transistor Q3 is controlled to be non-conductive, and the transistor Q4 is controlled to be conductive. Therefore, the level shift amplification modulation signal AMs2 having the same reference potential as the amplification modulation signal AMs1 output to the midpoint CP1 of the digital amplifier circuit 550 is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t10 to time t20, the drive signal output circuit 50 outputs a drive signal COM that changes from voltage Vc to voltage Vb.

In the period from time t20 to time t30, the drive signal output circuit 50 outputs a constant drive signal COM with the voltage value of voltage Vb. Specifically, in the period from time t20 to time t30, the reference drive data dA for generating a constant drive signal COM with a voltage value of voltage Vb is input to the reference drive signal output circuit 510. The reference drive signal output circuit 510 generates a constant reference drive signal aA at a voltage aVb based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. As illustrated in FIG. 7, since the potential of the reference drive signal aA is smaller than the threshold voltage aVth in the period from time t20 to time t30, the reference level switching circuit 561 outputs the L-level level switching signal Ls to the gate driver 562. As a result, the gate driver 562 outputs the L-level gate signal Hgs2 according to the logic level of the input level switching signal Ls and the H-level gate signal Lgs2 according to the signal in which the logic level of the input level switching signal Ls is inverted by the inverter circuit 565. As a result, the transistor Q3 is controlled to be non-conductive, and the transistor Q4 is controlled to be conductive. Therefore, the level shift amplification modulation signal AMs2 having the same reference potential as the amplification modulation signal AMs1 output to the midpoint CP1 of the digital amplifier circuit 550 is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t20 to time t30, the drive signal output circuit 50 outputs a constant drive signal COM at a voltage Vb.

In the period from time t30 to time t40, the drive signal output circuit 50 outputs a drive signal COM in which the voltage value changes from voltage Vb to voltage Vt. Specifically, in the period from time t30 to time t40, the reference drive data dA for generating the drive signal COM in which the voltage value changes from the voltage Vb to the voltage Vt is input to the reference drive signal output circuit 510. The reference drive signal output circuit 510 generates a reference drive signal aA in which the voltage value changes from the voltage aVb to the voltage aVt based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. In the period from time t30 to time t40, in the period from time t30 to time tc2 in which the voltage value of the reference drive signal aA is lower than the threshold voltage aVth, the reference level switching circuit 561 outputs the L-level level switching signal Ls to the gate driver 562. As a result, the gate driver 562 outputs the L-level gate signal Hgs2 according to the logic level of the input level switching signal Ls and the H-level gate signal Lgs2 according to the signal in which the logic level of the input level switching signal Ls is inverted by the inverter circuit 565. As a result, the transistor Q3 is controlled to be non-conductive, and the transistor Q4 is controlled to be conductive. Therefore, the level shift amplification modulation signal AMs2 having the same reference potential as the amplification modulation signal AMs1 output to the midpoint CP1 of the digital amplifier circuit 550 is output to the midpoint CP2 of the level shift circuit 560.

In addition, in the period from time t30 to time t40, in the period from time tc2 to time t40 in which the voltage value of the reference drive signal aA is higher than the threshold voltage aVth, the reference level switching circuit 561 outputs the H-level level switching signal Ls to the gate driver 562. As a result, the gate driver 562 outputs the H-level gate signal Hgs2 according to the logic level of the input level switching signal Ls and the L-level gate signal Lgs2 according to the signal in which the logic level of the input level switching signal Ls is inverted by the inverter circuit 565. As a result, the transistor Q3 is controlled to be conductive, and the transistor Q4 is controlled to be non-conductive. Therefore, the level shift amplification modulation signal AMs2 obtained by shifting the reference potential of the amplification modulation signal AMs1 output to the midpoint CP1 of the digital amplifier circuit 550 according to the voltage VMV2 input to the bootstrap circuit BS is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t30 to time t40, the drive signal output circuit 50 outputs a drive signal COM that changes from voltage Vb to voltage Vt.

In the period from time t40 to time t50, the drive signal output circuit 50 outputs a constant drive signal COM with the voltage value of voltage Vt. Specifically, in the period from time t40 to time t50, the reference drive data dA for generating a constant drive signal COM with the voltage value of voltage Vt is input to the reference drive signal output circuit 510. The reference drive signal output circuit 510 generates a constant reference drive signal aA at a voltage aVt based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. As illustrated in FIG. 7, since the potential of the reference drive signal aA is larger than the threshold voltage aVth in the period from time t40 to time t50, the reference level switching circuit 561 outputs the L-level level switching signal Ls to the gate driver 562. As a result, the gate driver 562 outputs the H-level gate signal Hgs2 according to the logic level of the input level switching signal Ls and the L-level gate signal Lgs2 according to the signal in which the logic level of the input level switching signal Ls is inverted by the inverter circuit 565. As a result, the transistor Q3 is controlled to be conductive, and the transistor Q4 is controlled to be non-conductive. Therefore, the level shift amplification modulation signal AMs2 obtained by shifting the reference potential of the amplification modulation signal AMs1 output to the midpoint CP1 of the digital amplifier circuit 550 according to the voltage VMV2 input to the bootstrap circuit BS is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t40 to time t50, the drive signal output circuit 50 outputs a constant drive signal COM at a voltage Vt.

In the period from time t50 to time t60, the drive signal output circuit 50 outputs a drive signal COM in which the voltage value changes from voltage Vt to voltage Vc. Specifically, in the period from time t50 to time t60, the reference drive data dA for generating the drive signal COM in which the voltage value changes from the voltage Vt to the voltage Vc is input to the reference drive signal output circuit 510. The reference drive signal output circuit 510 generates a reference drive signal aA in which the voltage value changes from the voltage aVt to the voltage aVc based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. Since the voltage value of the reference drive signal aA is larger than the threshold voltage aVth in the period from time t50 to time t60, the reference level switching circuit 561 outputs the H-level level switching signal Ls to the gate driver 562. As a result, the gate driver 562 outputs the H-level gate signal Hgs2 according to the logic level of the input level switching signal Ls and the L-level gate signal Lgs2 in which the logic level of the input level switching signal Ls is inverted by the inverter circuit 565. As a result, the transistor Q3 is controlled to be conductive, and the transistor Q4 is controlled to be non-conductive. Therefore, the level shift amplification modulation signal AMs2 obtained by shifting the reference potential of the amplification modulation signal AMs1 output to the midpoint CP1 of the digital amplifier circuit 550 according to the voltage VMV2 input to the bootstrap circuit BS is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t50 to time t60, the drive signal output circuit 50 outputs a drive signal COM that changes from voltage Vt to voltage Vc.

In the period from time t60 to time t70, the drive signal output circuit 50 outputs a constant drive signal COM with the voltage value of voltage Vc. Specifically, in the period from time t60 to time t70, the reference drive data dA for generating a constant drive signal COM with the voltage value of voltage Vc is input to the reference drive signal output circuit 510. The reference drive signal output circuit 510 generates a constant reference drive signal aA at a voltage aVc based on the input reference drive data dA. Thereafter, the reference drive signal output circuit 510 outputs the generated reference drive signal aA to the pulse modulation circuit 530 via the adder 511.

The pulse modulation circuit 530 generates a modulation signal Ms which is a PDM signal by pulse density modulation of the reference drive signal aA input from the reference drive signal output circuit 510, and outputs the modulation signal Ms to the digital amplifier circuit 550. The modulation signal Ms is input to the gate driver 551 included in the digital amplifier circuit 550. The gate driver 551 outputs the gate signal Hgs1 according to the logic level of the input modulation signal Ms and the gate signal Lgs1 according to the signal in which the logic level of the input modulation signal Ms is inverted by the inverter circuit 554. When the transistors Q1 and Q2 included in the digital amplifier circuit 550 operate based on the gate signals Hgs1 and Lgs1, the amplification modulation signal AMs1 obtained by amplifying the modulation signal Ms based on the voltage VMV1 is output to the midpoint CP1 of the digital amplifier circuit 550.

In addition, the reference drive signal output circuit 510 also outputs the reference drive signal aA to the reference level switching circuit 561 included in the level shift circuit 560. As illustrated in FIG. 7, since the potential of the reference drive signal aA is larger than the threshold voltage aVth in the period from time t60 to time t70, the reference level switching circuit 561 outputs the H-level level switching signal Ls to the gate driver 562. As a result, the gate driver 562 outputs the H-level gate signal Hgs2 according to the logic level of the input level switching signal Ls and the L-level gate signal Lgs2 according to the signal in which the logic level of the input level switching signal Ls is inverted by the inverter circuit 565. As a result, the transistor Q3 is controlled to be conductive, and the transistor Q4 is controlled to be non-conductive. Therefore, the level shift amplification modulation signal AMs2 obtained by shifting the reference potential of the amplification modulation signal AMs1 output to the midpoint CP1 of the digital amplifier circuit 550 according to the voltage VMV2 input to the bootstrap circuit BS is output to the midpoint CP2 of the level shift circuit 560.

The level shift amplification modulation signal AMs2 output by the level shift circuit 560 is input to the demodulation circuit 580, and the demodulation circuit 580 demodulates by smoothing the level shift amplification modulation signal AMs2. As a result, in the period from time t60 to time t70, the drive signal output circuit 50 outputs a constant drive signal COM with the voltage value of voltage Vc. Thereafter, the drive signal output circuit 50 returns to time t0 and repeatedly performs the same operation.

Here, as illustrated in FIG. 7, in a period during which the voltage value of the reference drive signal aA is higher than the threshold voltage aVth and the voltage value of the drive signal COM is constant, the reference level switching circuit 561 included in the level shift circuit 560 performs a charge control CH that inverts the logic level of the level switching signal Ls only for a short time regardless of whether the voltage value of the reference drive signal aA is higher or lower than the threshold voltage aVth.

The level shift amplification modulation signal AMs2 is generated by shifting the reference potential of the amplification modulation signal AMs1 output by the digital amplifier circuit 550 as illustrated in the present embodiment in the level shift circuit 560, the drive signal COM is generated by demodulating the level shift amplification modulation signal AMs2 with the demodulation circuit 580, and in the output drive signal output circuit 50, the transistor Q3 included in the level shift circuit 560 continues to be conductive and the transistor Q4 continues to be non-conductive in a period during which the potential of the drive signal COM is larger than the threshold voltage Vth. When the transistor Q3 continues to be conductive and the transistor Q4 continues to be non-conductive, the electric charge of the capacitor C2 stored by the voltage Vg is gradually released because the potential of the midpoint CP2 does not fluctuate, and the potential of the voltage output by the bootstrap circuit configured to include the capacitor C2 and the diode D2 decreases. As a result, the potential of the gate signal Hgs2 output by the gate driver 562 decreases. When the potential of the gate signal Hgs2 decreases, the gate driver 562 cannot continuously control the transistor Q3 to be conductive, and the waveform accuracy of the level shift amplification modulation signal AMs2 and the waveform accuracy of the drive signal COM based on the level shift amplification modulation signal AMs2 may decrease.

In response to such a problem, in the drive signal output circuit 50 included in the liquid ejecting apparatus 1 in the present embodiment, in the period during which the voltage value of the reference drive signal aA is higher than the threshold voltage aVth and the voltage value of the drive signal COM is constant, the reference level switching circuit 561 performs the charge control CH that inverts the logic level of the level switching signal Ls only for a short time regardless of whether the voltage value of the reference drive signal aA is higher or lower than the threshold voltage aVth. Therefore, only for a short time, the transistor Q3 included in the level shift circuit 560 is controlled to be non-conductive, and the transistor Q4 is controlled to be conductive. That is, the reference potential of the level shift amplification modulation signal AMs2 output to the midpoint CP2 only for a short time changes from the potential based on the voltage VMV2 to the ground potential.

When the potential of the midpoint CP2 changes, the electric charge based on the voltage Vg is stored again in the capacitor C2. As a result, the possibility that the potential of the gate signal Hgs2 is lowered is reduced, the possibility that the waveform accuracy of the level shift amplification modulation signal AMs2 is lowered is reduced, and the possibility that the waveform accuracy of the drive signal COM based on the level shift amplification modulation signal AMs2 is lowered is reduced.

That is, in the drive signal output circuit 50 included in the liquid ejecting apparatus 1 in the present embodiment, the level shift circuit 560 has a state in which the reference potential of the amplification modulation signal AMs1 is set as the ground potential and a state in which the reference potential of the amplification modulation signal AMs1 is set as the potential based on the voltage VMV2 generated by the bootstrap circuit BS. In a state where the reference potential of the amplification modulation signal AMs1 is a potential based on the voltage VMV2 generated by the bootstrap circuit BS, the gate driver 562 performs a constant voltage control that controls the potential of the drive signal COM to be constant by outputting the gate signal Hgs2 which controls the transistor Q3 to be conductive and the gate signal Lgs2 which controls the transistor Q4 to be non-conductive, and the charge control CH that outputs the gate signal Hgs2 which controls the transistor Q3 to be non-conductive and the gate signal Lgs2 which controls the transistor Q4 to be conductive, and then outputs the gate signal Hgs2 which controls the transistor Q3 to be conductive and the gate signal Lgs2 which controls the transistor Q4 to be non-conductive.

The potential of the midpoint CP2 changes by the charge control CH, and the electric charge based on the voltage Vg is stored again in the capacitor C2 that defines the potential of the gate signal Hgs2. As a result, the possibility that the potential of the gate signal Hgs2 is lowered is reduced, the possibility that the waveform accuracy of the level shift amplification modulation signal AMs2 is lowered is reduced, and the possibility that the waveform accuracy of the drive signal COM based on the level shift amplification modulation signal AMs2 is lowered is reduced. That is, the waveform accuracy of the drive signal COM output by the drive signal output circuit 50 is improved.

The reference level switching circuit 561 may output the L-level level switching signal Ls for causing the gate driver 562 to perform the charge control CH, for example, based on information output by the control portion 100 together with the reference drive data dA. In addition, the drive signal output circuit 50 may include a detection circuit (not illustrated) such as a differential voltage detection circuit for detecting the voltage at both ends of the capacitor C2, and when the potential difference between both ends of the capacitor C2 detected by the detection circuit detects a predetermined value and the detection result falls below a predetermined threshold value, the reference level switching circuit 561 may output an L-level level switching signal Ls for causing the gate driver 562 to perform the charge control CH.

In addition, in at least a part of the period during which the gate driver 562 performs the charge control CH that outputs the gate signal Hgs2 which controls the transistor Q3 to be non-conductive and the gate signal Lgs2 which controls the transistor Q4 to be conductive, and then outputs the gate signal Hgs2 which controls the transistor Q3 to be conductive and the gate signal Lgs2 which controls the transistor Q4 to be non-conductive, the gate driver 551 included in the digital amplifier circuit 550 preferably outputs a gate signal Hgs1 that controls the transistor Q1 to be non-conductive and a gate signal Lgs1 that controls the transistor Q2 to be conductive.

As a result, the potential of the midpoint CP2 of the level shift circuit 560 is lowered to the ground potential in at least a part of the period during which the gate driver 562 performs the charge control CH. As a result, the capacitor C2 stores more electric charge based on the voltage Vg, and as a result, the possibility that the potential of the gate signal Hgs2 is lowered is further reduced, the possibility that the waveform accuracy of the level shift amplification modulation signal AMs2 is lowered is further reduced, and the possibility that the waveform accuracy of the drive signal COM based on the level shift amplification modulation signal AMs2 is lowered is further reduced.

In addition, as illustrated in FIG. 7, the period during which the gate driver 562 performs the charge control CH as described above is preferably sufficiently shorter than the period during which the gate driver 562 performs the low voltage control, and the charge control CH is preferably performed a plurality of times. In the period during which the gate driver 562 is performing the charge control CH, the gate driver 562 controls the transistor Q3 to be non-conductive and the transistor Q4 to be conductive. Therefore, the signal waveform of the level shift amplification modulation signal AMs2 may be disturbed. When the disturbance generated in the signal waveform of such level shift amplification modulation signal AMs2 is short, the disturbance is reduced by a low-pass filter circuit configured to include the inductor L1 and the capacitor C5 included in the demodulation circuit 580. That is, the period during which the gate driver 562 performs the charge control CH is sufficiently shorter than the period during which the gate driver 562 performs the low voltage control, and the charge control CH is performed a plurality of times. Therefore, even when the signal waveform of the level shift amplification modulation signal AMs2 is disturbed due to the charge control CH, the possibility that the waveform accuracy of the drive signal COM is lowered by the low-pass filter circuit configured to include the inductor L1 and the capacitor C5 is reduced.

In addition, in the state where the level shift circuit 560 sets the reference potential of the amplification modulation signal AMs1 as the potential based on the voltage VMV2 generated by the bootstrap circuit BS, as illustrated in FIG. 7, it is preferable that the charge control CH is performed for a certain period during which the potential of the drive signal COM is a voltage Vc, Vb, and Vt. The piezoelectric element 60 is held at a constant displacement for a certain period during which the potential of the drive signal COM is a voltage Vc, Vb, and Vt. Therefore, even when a slight waveform distortion occurs in the level shift amplification modulation signal AMs2 due to the charge control CH, the possibility that ink is erroneously ejected from the ejecting portion 600 is reduced. That is, the accuracy of the image formed on the medium when placed in the liquid ejecting apparatus 1 is improved.

In addition, although not illustrated, in the state where the level shift circuit 560 sets the reference potential of the amplification modulation signal AMs1 as the potential based on the voltage VMV2 generated by the bootstrap circuit BS, as illustrated in FIG. 7, it is preferable that the charge control CH as described above is performed for a certain period during which the potential of the drive signal COM is a voltage Vc. As described above, the period during which the potential of the drive signal COM is constant at the voltage Vb is the period during which the piezoelectric element 60 is held in a displaced state so as to supply the liquid to the ejecting portion 600, and the period during which the potential of the drive signal COM is constant at the voltage Vt is a period during which the piezoelectric element 60 is held in a displaced state so as to eject the ink supplied to the ejecting portion 600. On the other hand, the period during which the potential of the drive signal COM is constant at the voltage Vc is the period during which the piezoelectric element 60 is not driven and is held in a constant state. Therefore, even when a slight waveform distortion occurs in the level shift amplification modulation signal AMs2 due to the charge control CH and the waveform of the drive signal COM is disturbed due to the waveform distortion, the possibility that ink is erroneously ejected from the ejecting portion 600 is reduced. That is, the accuracy of the image formed on the medium when placed in the liquid ejecting apparatus 1 is further improved.

4. Effects

As described above, in the drive signal output circuit 50 of the present embodiment, in a state where the level shift circuit 560 sets the reference potential of the amplification modulation signal AMs1 output to the midpoint CP1 to the potential based on the voltage VMV2 supplied to the bootstrap circuit BS having a potential higher than the ground potential, the gate driver 562 included in the level shift circuit 560 performs the constant voltage control that outputs a constant reference potential by outputting the gate signal Hgs2 which controls the transistor Q3 to be conductive and the gate signal Lgs2 which controls the transistor Q4 to be non-conductive, and the charge control CH that charges the capacitor C2 by outputting the gate signal Hgs2 which controls the transistor Q3 to be non-conductive and the gate signal Lgs2 which controls the transistor Q4 to be conductive, and then outputting the gate signal Hgs2 which controls the transistor Q3 to be conductive and the gate signal Lgs2 which controls the transistor Q4 to be non-conductive.

As a result, even in a state where the reference potential of the amplification modulation signal AMs1 output to the midpoint CP1 is a potential based on the voltage VMV2 supplied to the bootstrap circuit BS having a potential higher than the ground potential, the capacitor C2 used to generate the gate signal Hgs2 for driving the transistor Q3 of the level shift circuit 560 can be charged. Therefore, the possibility of malfunction of the transistor Q3 included in the level shift circuit 560 is reduced, and as a result, the accuracy of the level shift amplification modulation signal AMs2 output to the midpoint CP2 is improved. Therefore, the waveform accuracy of the drive signal COM demodulated and output by smoothing the level shift amplification modulation signal AMs2 is improved.

In addition, in at least a part of the period during which the gate driver 562 performs the charge control CH, the gate driver 551 included in the digital amplifier circuit 550 can output the gate signal Hgs1 that controls the transistor Q1 to be non-conductive and the gate signal Hgs2 that controls the transistor Q2 to be conductive, and can further reduce the potential of the midpoint CP2 to which the other end of the capacitor C2 is coupled. As a result, it is possible to stably store the electric charge in the capacitor C2. Therefore, the possibility of malfunction of the transistor Q3 included in the level shift circuit 560 is further reduced, and as a result, the accuracy of the level shift amplification modulation signal AMs2 output to the midpoint CP2 is further improved. Therefore, the waveform accuracy of the drive signal COM demodulated and output by smoothing the level shift amplification modulation signal AMs2 is further improved.

In addition, a period of the charge control CH that charges the capacitor C2 by outputting the gate signal Hgs2 which controls the transistor Q3 to be non-conductive and the gate signal Lgs2 which controls the transistor Q4 to be conductive, and then outputting the gate signal Hgs2 which controls the transistor Q3 to be conductive and the gate signal Lgs2 which controls the transistor Q4 to be non-conductive performed by the gate driver 562 of the level shift circuit 560 is preferably shorter than a period of the constant voltage control that outputs a constant reference potential by outputting the gate signal Hgs2 which controls the transistor Q3 to be conductive and the gate signal Lgs2 which controls the transistor Q4 to be non-conductive performed by the gate driver 562 of the level shift circuit 560. By outputting the gate signal Hgs2 that controls the transistor Q3 to be non-conductive and the gate signal Lgs2 that controls the transistor Q4 to be conductive, and then outputting the gate signal Hgs2 that controls the transistor Q3 to be conductive and the gate signal Lgs2 that controls the transistor Q4 to be non-conductive, the period of the charge control CH that charges the capacitor C2 controls the transistors Q3 and Q4 regardless of the potential of the reference drive signal aA, so that the waveform accuracy of the drive signal COM may decrease. The period of the charge control CH that charges the capacitor C2 by outputting the gate signal Hgs2 which controls the transistor Q3 to be non-conductive and the gate signal Lgs2 which controls the transistor Q4 to be conductive, and then outputting the gate signal Hgs2 which controls the transistor Q3 to be conductive and the gate signal Lgs2 which controls the transistor Q4 to be non-conductive performed by the gate driver 562 of the level shift circuit 560 is shorter than the period of the constant voltage control that outputs a constant reference potential by outputting the gate signal Hgs2 which controls the transistor Q3 to be conductive and the gate signal Lgs2 which controls the transistor Q4 to be non-conductive performed by the gate driver 562 of the level shift circuit 560. Therefore, the possibility that the electric charge of the capacitor C2 is released and an operation abnormality occurs in the transistor Q3 can be reduced, and the possibility that the waveform of the drive signal COM is distorted due to the charge control CH is reduced.

Here, in the period during which the level shift amplification modulation signal AMs2 in which the reference potential of the amplification modulation signal AMs1 output by the level shift circuit 560 to the midpoint CP1 is the potential based on the voltage VMV2 supplied to the bootstrap circuit BS having a potential higher than the ground potential is output, the charge control CH described above may be performed a plurality of times, and the charge control CH may detect the voltage at the both ends of the capacitor C2 and may be performed according to the result of the detection. As a result, the charge control CH can be performed at the optimum timing for the optimum period, and as a result, the electric charge can be more stably stored in the capacitor C2. Therefore, the possibility of malfunction of the transistor Q3 included in the level shift circuit 560 is further reduced, and as a result, the accuracy of the level shift amplification modulation signal AMs2 output to the midpoint CP2 is further improved. Therefore, the waveform accuracy of the drive signal COM demodulated and output by smoothing the level shift amplification modulation signal AMs2 is further improved.

Although the embodiments have been described above, the present disclosure is not limited to these embodiments, and can be implemented in various embodiments without departing from the gist thereof. For example, the above embodiments can be combined as appropriate.

The present disclosure includes a configuration substantially the same as the configuration described in the embodiment (for example, a configuration having the same function, method, and result, or a configuration having the same purpose and effect). In addition, the present disclosure also includes a configuration in which a non-essential part of the configuration described in the embodiment is replaced. In addition, the present disclosure also includes a configuration that exhibits the same effects as the configuration described in the embodiment or a configuration that can achieve the same object. In addition, the present disclosure also includes a configuration in which a known technique is added to the configuration described in the embodiment.

The following contents are derived from the above-described embodiment.

According to an aspect, there is provided a drive circuit that outputs a drive signal driving a drive portion, the circuit including a modulation circuit that outputs a modulation signal obtained by modulating a reference drive signal which is a reference of the drive signal; an amplifier circuit that outputs an amplification modulation signal obtained by amplifying the modulation signal from a first output point; a level shift circuit that outputs a level shift amplification modulation signal obtained by shifting a potential of the amplification modulation signal from a second output point; and a demodulation circuit that demodulates the level shift amplification modulation signal and outputs the drive signal, in which the amplifier circuit includes a first gate driver that outputs a first gate signal and a second gate signal based on the modulation signal, a first transistor of which a first voltage is supplied to one end, and the other end is electrically coupled to the first output point, and which operates based on the first gate signal, and a second transistor of which one end is electrically coupled to the first output point and which operates based on the second gate signal, the level shift circuit includes a bootstrap circuit to which a second voltage and the amplification modulation signal are input and which outputs a third voltage, a second gate driver that outputs a third gate signal and a fourth gate signal based on the reference drive signal, a third transistor of which the third voltage is supplied to one end, and the other end is electrically coupled to the second output point, and which operates based on the third gate signal, and a fourth transistor of which one end is electrically coupled to the second output point, and the other end is electrically coupled to the first output point, and which operates based on the fourth gate signal, a capacitive element of which one end is electrically coupled to the second gate driver, a fourth voltage is supplied, and the other end is electrically coupled to the other end of the third transistor, the level shift circuit has a first mode in which a reference potential of the amplification modulation signal is set to a first potential, and a second mode in which the reference potential of the amplification modulation signal is set to a second potential having a potential higher than the first potential, and in the second mode, the second gate driver performs a constant voltage control that outputs the third gate signal controlling the third transistor to be conductive and the fourth gate signal controlling the fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

According to the drive circuit, the drive signal COM can be generated based on the first voltage and the second voltage having a low potential with respect to the potential of the drive signal by the operation of the level shift circuit with a small number of switching times. Therefore, the loss generated in the first transistor, the second transistor, the third transistor, and the fourth transistor can be reduced. As a result, the power consumption of the drive circuit can be reduced. Furthermore, in the period during which the amplification modulation signal having the second potential higher than the first potential as the reference potential is output as the level shift amplification modulation signal, the level shift circuit performs the charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive. Therefore, the possibility that the electric charge of the capacitive element which functions as a bootstrap capacitor, of which one end is electrically coupled to the second gate driver, the fourth voltage is supplied, and the other end is electrically coupled to the other end of the third transistor, is unintentionally released is reduced. As a result, the operation of the drive circuit is stable and the waveform accuracy of the drive signal output by the drive circuit is improved.

In an aspect of the drive circuit, in at least a part of a period during which the second gate driver performs the charge control, the first gate driver may output the first gate signal that controls the first transistor to be non-conductive and the second gate signal that controls the second transistor to be conductive.

According to the drive circuit, in the period of the charge control, in the capacitive element which functions as a bootstrap capacitor, of which one end is electrically coupled to the second gate driver, the fourth voltage is supplied, and the other end is electrically coupled to the other end of the third transistor, the potential of the other end, which is different from the one end to which the fourth voltage is supplied, can be made sufficiently smaller than the fourth voltage. As a result, the electric charge can be stably stored in the capacitive element during the period of the charge control. As a result, the operation of the drive circuit is stable, and the waveform accuracy of the drive signal output by the drive circuit is improved.

In an aspect of the drive circuit, in the second mode, a period during which the second gate driver performs the charge control may be shorter than a period during which the second gate driver performs the constant voltage control.

According to the drive circuit, the possibility that the waveform accuracy of the drive signal is lowered due to the distortion of the waveform of the level shift amplification modulation signal is reduced in the period during which the charge control is performed.

In an aspect of the drive circuit, the second gate driver may perform the charge control a plurality of times in the second mode.

According to the drive circuit, the capacitive element can store the electric charge more stably, and as a result, the operation of the drive circuit is more stable, and the waveform accuracy of the drive signal output by the drive circuit is further improved.

In an aspect of the drive circuit, the second gate driver may perform the charge control in a period during which a potential of the drive signal is constant in the second mode.

According to the drive circuit, the possibility of malfunction of the drive portion due to the waveform distortion of the drive signal generated in the period during which the charge control is performed is reduced.

In an aspect of the drive circuit, the drive portion may be a liquid ejecting head that includes a piezoelectric element and ejects a liquid by driving the piezoelectric element, the drive signal may include a first drive waveform that drives the piezoelectric element so as to supply the liquid to the drive portion, a second drive waveform that drives the piezoelectric element so as to eject the liquid supplied to the drive portion, and a third drive waveform that does not drive the piezoelectric element and holds the piezoelectric element in a constant state, and the second gate driver may perform the charge control in a period during which the drive signal has the third drive waveform in the second mode.

According to the drive circuit, when the drive portion is the liquid ejecting head, the charge control is performed in the period during which the drive circuit generates the drive signal waveform that does not contribute to the ejection of the liquid. Therefore, the possibility that the ejection accuracy is lowered due to the waveform distortion of the drive signal generated in the period during which the charge control is performed is reduced.

In an aspect of the drive circuit, the circuit includes a detection circuit that detects a voltage of the capacitive element, in which the second gate driver may switch between the constant voltage control and the charge control based on a detection result of the detection circuit.

According to the drive circuit, the charge control can be performed after grasping the state of the capacitive element that charges the electric charge. Therefore, the charge control can be performed at a more optimum timing, and the electric charge can be stored more stably in the capacitive element. As a result, the operation of the drive circuit is more stable, and the waveform accuracy of the drive signal output by the drive circuit is further improved.

According to another aspect, there is provided a liquid ejecting apparatus including an ejecting portion that ejects a liquid; and a drive circuit that outputs a drive signal driving the ejecting portion, in which the drive circuit includes a modulation circuit that outputs a modulation signal obtained by modulating a reference drive signal which is a reference of the drive signal; an amplifier circuit that outputs an amplification modulation signal obtained by amplifying the modulation signal from a first output point; a level shift circuit that outputs a level shift amplification modulation signal obtained by shifting a potential of the amplification modulation signal from a second output point; and a demodulation circuit that demodulates the level shift amplification modulation signal and outputs the drive signal, in which the amplifier circuit includes a first gate driver that outputs a first gate signal and a second gate signal based on the modulation signal, a first transistor of which a first voltage is supplied to one end, and the other end is electrically coupled to the first output point, and which operates based on the first gate signal, and a second transistor of which one end is electrically coupled to the first output point and which operates based on the second gate signal, the level shift circuit includes a bootstrap circuit to which a second voltage and the amplification modulation signal are input and which outputs a third voltage, a second gate driver that outputs a third gate signal and a fourth gate signal based on the reference drive signal, a third transistor of which the third voltage is supplied to one end, and the other end is electrically coupled to the second output point, and which operates based on the third gate signal, and a fourth transistor of which one end is electrically coupled to the second output point, and the other end is electrically coupled to the first output point, and which operates based on the fourth gate signal, a capacitive element of which one end is electrically coupled to the second gate driver, a fourth voltage is supplied, and the other end is electrically coupled to the other end of the third transistor, the level shift circuit has a first mode in which a reference potential of the amplification modulation signal is set to a first potential, and a second mode in which the reference potential of the amplification modulation signal is set to a second potential having a potential higher than the first potential, and in the second mode, the second gate driver performs a constant voltage control that outputs the third gate signal controlling the third transistor to be conductive and the fourth gate signal controlling the fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

According to the liquid ejecting apparatus, in the drive circuit, the drive signal COM can be generated based on the first voltage and the second voltage, which are low potentials with respect to the potential of the drive signal, by operating the level shift circuit with a small number of switching times. Therefore, the loss generated in the first transistor, the second transistor, the third transistor, and the fourth transistor can be reduced, and as a result, the power consumption of the drive circuit can be reduced. Furthermore, in the period during which the amplification modulation signal having the second potential higher than the first potential as the reference potential is output as the level shift amplification modulation signal, the level shift circuit performs the charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive. Therefore, the possibility that the electric charge of the capacitive element which functions as a bootstrap capacitor, of which one end is electrically coupled to the second gate driver, the fourth voltage is supplied, and the other end is electrically coupled to the other end of the third transistor, is unintentionally released is reduced. As a result, the operation of the drive circuit is stable and the waveform accuracy of the drive signal output by the drive circuit is improved.

What is claimed is:

1. A drive circuit that outputs a drive signal driving a drive portion, the circuit comprising:

a modulation circuit that outputs a modulation signal obtained by modulating a reference drive signal which is a reference of the drive signal;

an amplifier circuit that outputs an amplification modulation signal obtained by amplifying the modulation signal from a first output point;

a level shift circuit that outputs a level shift amplification modulation signal obtained by shifting a potential of the amplification modulation signal from a second output point; and a demodulation circuit that demodulates the level shift amplification modulation signal and outputs the drive signal, wherein the amplifier circuit includes a first gate driver that outputs a first gate signal and a second gate signal based on the modulation signal, a first transistor of which a first voltage is supplied to one end, and the other end is electrically coupled to the first output point, and which operates based on the first gate signal, and a second transistor of which one end is electrically coupled to the first output point and which operates based on the second gate signal, the level shift circuit includes a bootstrap circuit to which a second voltage and the amplification modulation signal are input and which outputs a third voltage, a second gate driver that outputs a third gate signal and a fourth gate signal based on the reference drive signal, a third transistor of which the third voltage is supplied to one end, and the other end is electrically coupled to the second output point, and which operates based on the third gate signal, a fourth transistor of which one end is electrically coupled to the second output point, and the other end is electrically coupled to the first output point, and which operates based on the fourth gate signal, and a capacitive element of which one end is electrically coupled to the second gate driver, a fourth voltage is supplied, and the other end is electrically coupled to the other end of the third transistor, the level shift circuit has a first mode in which a reference potential of the amplification modulation signal is set to a first potential, and a second mode in which the reference potential of the amplification modulation signal is set to a second potential having a potential higher than the first potential, and in the second mode, the second gate driver performs a constant voltage control that outputs the third gate signal controlling the third transistor to be conductive and the fourth gate signal controlling the fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

2. The drive circuit according to claim 1, wherein in at least a part of a period during which the second gate driver performs the charge control, the first gate driver outputs the first gate signal that controls the first transistor to be non-conductive and the second gate signal that controls the second transistor to be conductive.

3. The drive circuit according to claim 1, wherein in the second mode, a period during which the second gate driver performs the charge control is shorter than a period during which the second gate driver performs the constant voltage control.

4. The drive circuit according to claim 1, wherein the second gate driver performs the charge control a plurality of times in the second mode.

5. The drive circuit according to claim 1, wherein the second gate driver performs the charge control in a period during which a potential of the drive signal is constant in the second mode.

6. The drive circuit according to claim 1, wherein the drive portion is a liquid ejecting head that includes a piezoelectric element and ejects a liquid by driving the piezoelectric element, the drive signal includes a first drive waveform that drives the piezoelectric element so as to supply the liquid to the drive portion, a second drive waveform that drives the piezoelectric element so as to eject the liquid supplied to the drive portion, and a third drive waveform that does not drive the piezoelectric element and holds the piezoelectric element in a constant state, and the second gate driver performs the charge control in a period during which the drive signal has the third drive waveform in the second mode.

7. The drive circuit according to claim 1, further comprising:

a detection circuit that detects a voltage of the capacitive element, wherein the second gate driver switches between the constant voltage control and the charge control based on a detection result of the detection circuit.

8. A liquid ejecting apparatus comprising:

an ejecting portion that ejects a liquid; and a drive circuit that outputs a drive signal driving the ejecting portion, wherein the drive circuit includes a modulation circuit that outputs a modulation signal obtained by modulating a reference drive signal which is a reference of the drive signal, an amplifier circuit that outputs an amplification modulation signal obtained by amplifying the modulation signal from a first output point, a level shift circuit that outputs a level shift amplification modulation signal obtained by shifting a potential of the amplification modulation signal from a second output point, and a demodulation circuit that demodulates the level shift amplification modulation signal and outputs the drive signal, the amplifier circuit includes a first gate driver that outputs a first gate signal and a second gate signal based on the modulation signal, a first transistor of which a first voltage is supplied to one end, and the other end is electrically coupled to the first output point, and which operates based on the first gate signal, and a second transistor of which one end is electrically coupled to the first output point and which operates based on the second gate signal, the level shift circuit includes a bootstrap circuit to which a second voltage and the amplification modulation signal are input and that outputs a third voltage, a second gate driver that outputs a third gate signal and a fourth gate signal based on the reference drive signal, a third transistor of which the third voltage is supplied to one end, and the other end is electrically coupled to the second output point, and which operates based on the third gate signal, a fourth transistor of which one end is electrically coupled to the second output point, and the other end is electrically coupled to the first output point, and which operates based on the fourth gate signal, and a capacitive element of which one end is electrically coupled to the second gate driver, a fourth voltage is supplied, and the other end is electrically coupled to the other end of the third transistor, the level shift circuit has a first mode in which a reference potential of the amplification modulation signal is set to a first potential, and a second mode in which the reference potential of the amplification modulation signal is set to a second potential having a potential higher than the first potential, and in the second mode, the second gate driver performs a constant voltage control that outputs the third gate signal controlling the third transistor to be conductive and the fourth gate signal controlling the fourth transistor to be non-conductive, and a charge control that outputs the third gate signal controlling the third transistor to be non-conductive and the fourth gate signal controlling the fourth transistor to be conductive, and then outputs the third gate signal controlling the third transistor to be conductive and the fourth gate signal controlling the fourth transistor to be non-conductive.

* * * * *